US012597842B2

(12) United States Patent
Hanley

(10) Patent No.: US 12,597,842 B2
(45) Date of Patent: Apr. 7, 2026

(54) SELECTIVE VOLTAGE BOOSTING FOR A RADIO SYSTEM

(71) Applicant: Outdoor Wireless Networks LLC, Claremont, NC (US)

(72) Inventor: John T. Hanley, Orland Park, IL (US)

(73) Assignee: Outdoor Wireless Networks LLC, Richardson, TX (US)

( * ) Notice: Subject to any disclaimer, the term of this patent is extended or adjusted under 35 U.S.C. 154(b) by 233 days.

(21) Appl. No.: 18/576,297

(22) PCT Filed: May 4, 2022

(86) PCT No.: PCT/US2022/027670
§ 371 (c)(1),
(2) Date: Jan. 3, 2024

(87) PCT Pub. No.: WO2023/282966
PCT Pub. Date: Jan. 12, 2023

(65) Prior Publication Data
US 2024/0305182 A1     Sep. 12, 2024

Related U.S. Application Data

(60) Provisional application No. 63/218,778, filed on Jul. 6, 2021.

(51) Int. Cl.
H02M 3/156     (2006.01)
H02M 1/00     (2006.01)

(52) U.S. Cl.
CPC ......... *H02M 1/0048* (2021.05); *H02M 3/156* (2013.01)

(58) Field of Classification Search
CPC .... H02M 3/156; H02M 3/155; H02M 3/1552; H02M 3/1555; H02M 3/1566; H02M 3/157; H02M 3/158; H02M 3/1582; H02M 3/1584; H02M 1/0048; H02M 1/0051; H02M 1/0045
See application file for complete search history.

(56) References Cited

U.S. PATENT DOCUMENTS

| | | | |
|---|---|---|---|
| 9,448,576 B2 | 9/2016 | Chamberlain et al. | |
| 9,595,870 B2 | 3/2017 | Mao et al. | |
| 10,812,664 B2 | 10/2020 | Kostakis et al. | |
| 10,972,052 B2 | 4/2021 | Mura et al. | |

(Continued)

FOREIGN PATENT DOCUMENTS

| | | |
|---|---|---|
| EP | 2780772 B1 | 6/2016 |
| WO | 2018136812 A1 | 7/2018 |
| WO | 2023282966 A1 | 1/2023 |

OTHER PUBLICATIONS

International Searching Authority, "International Search Report and Written Opinion", from PCT Application No. PCT/US2022/027670, Sep. 1, 2022, pp. 1 through 8, Published: WO.

(Continued)

*Primary Examiner* — Nguyen Tran
(74) *Attorney, Agent, or Firm* — Fogg & Powers LLC

(57) ABSTRACT
Techniques for enhancing a power efficiency of a direct current (DC) power delivery system is provided. The power delivery system may be configured to provide DC power to a radio. The power delivery system bypasses or does not bypass a DC voltage converter based upon whether DC power efficiency will be increased.

24 Claims, 2 Drawing Sheets

(56)　　　　　References Cited

U.S. PATENT DOCUMENTS

Figure 1:
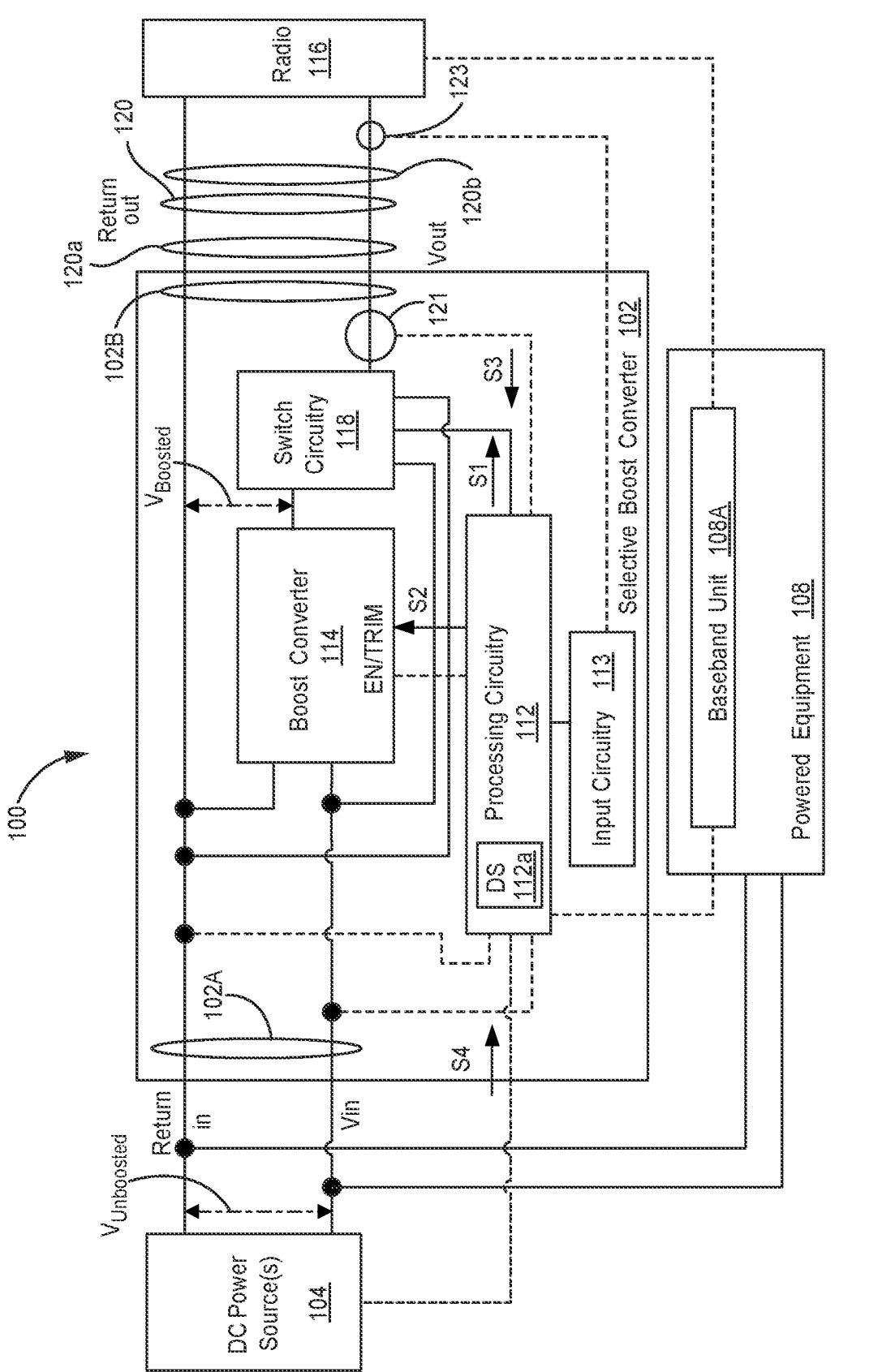

| 11,129,095 | B2 | 9/2021 | Gandhi |
| 2010/0156175 | A1 | 6/2010 | Wei |
| 2015/0155669 | A1 | 6/2015 | Chamberlain et al. |
| 2017/0168513 | A1 | 6/2017 | Chamberlain et al. |
| 2018/0213091 | A1* | 7/2018 | Kostakis ................. G05F 1/468 |
| 2024/0106326 | A1 | 3/2024 | Rabello et al. |
| 2024/0120834 | A1 | 4/2024 | Hanley |
| 2024/0170991 | A1 | 5/2024 | Hanley et al. |

OTHER PUBLICATIONS

European Patent Office, "Extended European Search Report", dated Mar. 24, 2025, from EP Application No. 22838189.3, from Foreign Counterpart to U.S. Appl. No. 18/576,297, pp. 1 through 10, Published: EP.

* cited by examiner

200

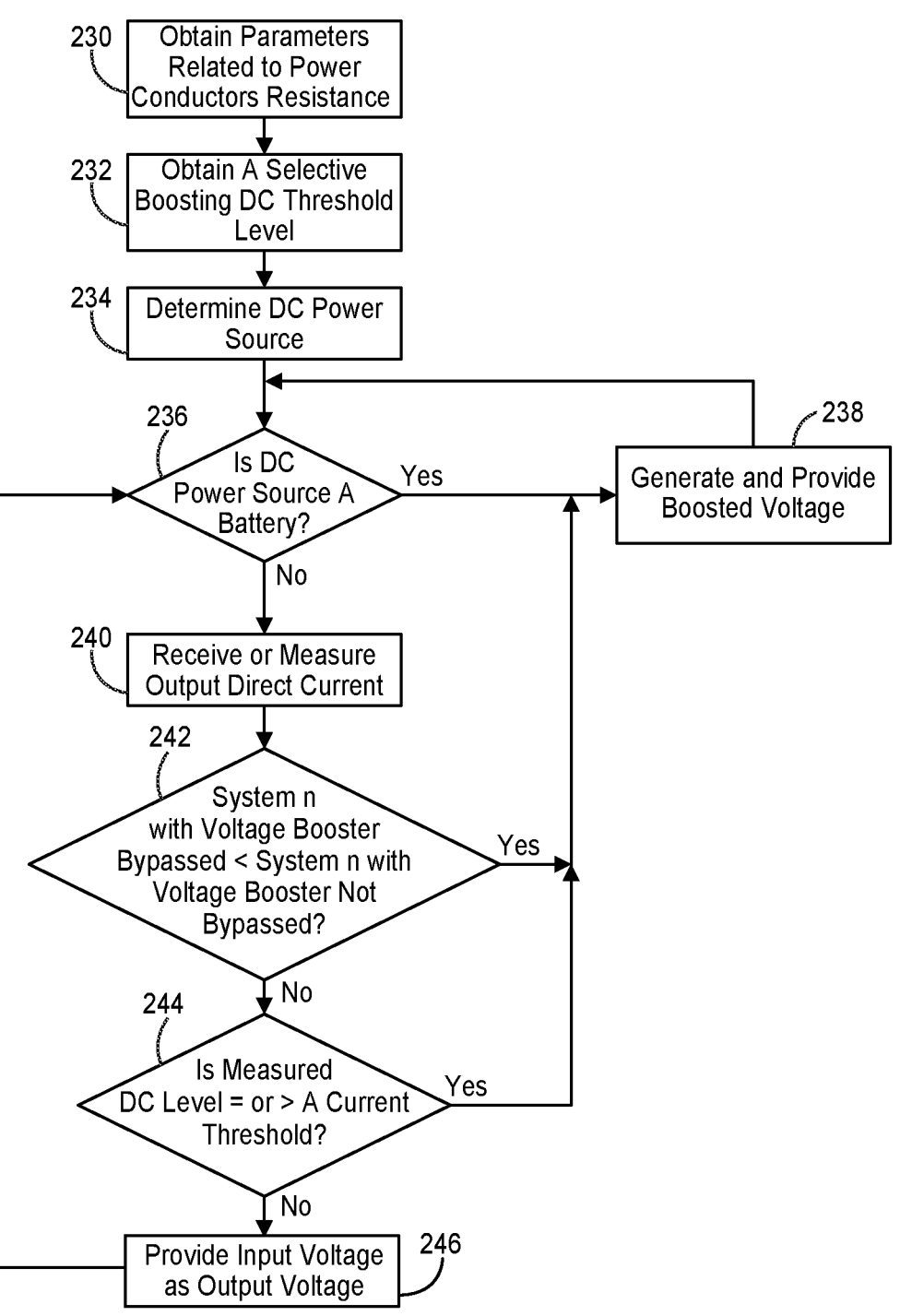

230  Obtain Parameters Related to Power Conductors Resistance

232  Obtain A Selective Boosting DC Threshold Level

234  Determine DC Power Source

236  Is DC Power Source A Battery?

238  Generate and Provide Boosted Voltage

240  Receive or Measure Output Direct Current

242  System n with Voltage Booster Bypassed < System n with Voltage Booster Not Bypassed?

244  Is Measured DC Level = or > A Current Threshold?

246  Provide Input Voltage as Output Voltage

FIG. 2

SELECTIVE VOLTAGE BOOSTING FOR A RADIO SYSTEM

CROSS-REFERENCE TO RELATED APPLICATIONS

The present application is a U.S. National Stage of International Patent Application No. PCT/US2022/027670, filed on May 4, 2022 and titled "SELECTIVE VOLTAGE BOOSTING FOR A RADIO SYSTEM," which claims benefit of U.S. patent application Ser. No. 63/218,778 filed Jul. 6, 2021; the entire contents of the aforementioned patent applications are incorporated herein by reference as if set forth in their entirety.

BACKGROUND

Direct current (DC) power may be remotely provisioned to a radio. For example, a radio mounted at a top of a mounting structure, e.g., a building and/or a tower, may be supplied DC power through electrical power conductors ("power conductors") from a DC power source at a bottom of the tower. The distance between the DC power source and the radio may be hundreds of feet or more; for example, the mounting structure may be hundreds of feet in height. As a result, the power conductors have a length at least as long, resulting in increased power conductor resistance. Because the radio may draw tens of amperes of direct current, power loss in, and voltage drop across, the power conductors can become significant. The increased power loss detrimentally affects DC power efficiency of a system providing DC power to the radio. DC power efficiency of a DC power source means a ratio determined by an output DC power level of the DC power source divided by an input DC power level of the DC power source. Further, if the voltage drop across the power conductors becomes too large, the voltage provided to a DC input of the radio may be below a minimum voltage level needed to operate the radio; thus, the radio may cease functioning and create a result in a lack of continuity of communications through the radio which is undesirable for network operators.

Power loss in, and voltage drop across, the power conductors can be diminished by increasing, or boosting, the voltage of the DC power source provided to an end of power conductors remote from the radio. This can be accomplished by deploying a DC voltage boost converter (or "boost converter") between the DC power source(s) and the power conductors. A boost converter is configured to boost a DC voltage input of the boost converter to a higher DC voltage at an output of the boost converter. As a result, the voltage provided at the DC input of the radio is increased, and direct current drawn by the radio is decreased. Due to the diminished direct current drawn through the power conductors, power loss in the power conductors is diminished, which increases the DC power efficiency of the system delivering DC power to the DC input of the radio.

The boost converter, however, has less than one hundred percent DC power efficiency. Boost converter DC power efficiency may have significantly diminished lower when the boost converter provides lower levels, e.g., low direct current. When the boost converter supplies lower levels of power, the diminished DC power efficiency of the boost converter may outweigh the increase in DC power efficiency derived from reducing power loss in the power conductors. When the DC voltage boost converter and power conductors operate at the lower DC power efficiency levels for long periods of time, operating expense is increased because more power must be purchased. The carbon footprint of a radio system utilizing the DC voltage boost converter and power conductors is undesirably increased.

SUMMARY

A selective boost converter is provided. The selective boost converter is configured to provide direct current (DC) power through power conductors to a radio. The selective boost converter comprises: input electrical conductors configured to be electrically coupled to at least one DC power source providing an unboosted DC voltage; output electrical conductors configured to be electrically coupled to the radio through the power conductors; switch circuitry electrically coupled to the output electrical conductors and the input electrical conductors; a DC voltage boost converter comprising a DC power input and a DC power output, wherein the DC power input of the DC voltage boost converter is electrically coupled to the input electrical conductors, wherein the DC power output of the DC voltage boost converter is electrically coupled to the switch circuitry; a current sensor coupled to the output electrical conductors and configured to measure a direct current level drawn through the output electrical conductors and output by a DC power delivery system; input circuitry configured to obtain at least one electrical parameter related to a resistance of the power conductors; and processing circuitry electrically coupled to the input circuitry and the switch circuitry, and configured to: based upon the measured direct current level, determine if a DC power efficiency of the DC power delivery system when the DC voltage boost converter is not bypassed is larger than a DC power efficiency of the DC power delivery system when the DC voltage boost converter is bypassed, wherein the DC power delivery system comprises the selective boost converter and the power conductors, and wherein the DC power efficiency of the DC power delivery system means a DC power output level by the DC power delivery system divided by a DC power level received by the DC power delivery system; upon determining that the DC power efficiency of the DC power delivery system when the DC voltage boost converter is not bypassed is larger than the DC power efficiency of the DC power delivery system when the DC voltage boost converter is bypassed, then provide a boosted DC voltage, generated by the DC voltage boost converter and from the unboosted DC voltage, through the switch circuitry to the output electrical conductors, wherein the boosted DC voltage greater than the unboosted DC voltage; and upon determining that the DC power efficiency of the DC power delivery system when the DC voltage boost converter is not bypassed is not larger than the DC power efficiency of the DC power delivery system when the DC voltage boost converter is bypassed, then provide the unboosted DC voltage through the switch circuitry to the output electrical conductors.

A method for enhancing direct current (DC) power efficiency of a DC power delivery system configured to provide DC power, through power conductors, to a DC power input of a radio is provided. The method comprising: receiving or measuring a direct current level drawn through the power conductors and output by the DC power delivery system, wherein the DC power delivery system comprises a selective boost converter and the power conductors, wherein the selective boost converter comprises a DC voltage boost converter, and wherein the DC voltage boost converter can be selectively bypassed or not bypassed; based upon the received or the measured direct current level, determining if a DC power efficiency of the DC power delivery system when the DC voltage boost converter is not bypassed is larger than a DC power efficiency of the DC power delivery system when the DC voltage boost converter is bypassed, wherein the DC power efficiency of the DC power delivery system means a DC power output level by the DC power delivery system divided by a DC power level received by the DC power delivery system; determining that the DC power efficiency of the DC power delivery system when the DC voltage boost converter is not bypassed is larger than the DC power efficiency of the DC power delivery system when the DC voltage boost converter is bypassed, then generating, with the DC voltage boost converter and from an unboosted DC voltage, a boosted DC voltage and providing the boosted DC voltage at an output of the selective boost converter, wherein the boosted DC voltage greater than the unboosted DC voltage; and determining that the DC power efficiency of the DC power delivery system when the DC voltage boost converter is not bypassed is not larger than the DC power efficiency of the DC power delivery system when the DC voltage boost converter is bypassed, then providing the unboosted DC voltage at the output of the selective boost converter.

A program product for enhancing direct current (DC) power efficiency of a DC power delivery system configured to provide DC power, through power conductors, to a DC power input of a radio is provided. The program product comprises a non-transitory processor readable medium on which program instructions are embodied, wherein the program instructions are configured, when executed by at least one processor, to cause the at least one processor to: receive or measure a direct current level drawn through the power conductors and output by the DC power delivery system, wherein the DC power delivery system comprises a selective boost converter and the power conductors, wherein the selective boost converter comprises a DC voltage boost converter, and wherein the DC voltage boost converter can be selectively bypassed or not bypassed; based upon the received or the measured direct current level, determine if a DC power efficiency of the DC power delivery system when the DC voltage boost converter is not bypassed is larger than a DC power efficiency of the DC power delivery system when the DC voltage boost converter is bypassed, wherein the DC power efficiency of the DC power delivery system means a DC power output level by the DC power delivery system divided by a DC power level received by the DC power delivery system; upon determining that the DC power efficiency of the DC power delivery system when the DC voltage boost converter is not bypassed is larger than the DC power efficiency of the DC power delivery system when the DC voltage boost converter is bypassed, then generate, with the DC voltage boost converter and from an unboosted DC voltage, a boosted DC voltage and providing the boosted DC voltage at an output of the selective boost converter, wherein the boosted DC voltage greater than the unboosted DC voltage; and upon determining that the DC power efficiency of the DC power delivery system when the DC voltage boost converter is not bypassed is not larger than the DC power efficiency of the DC power delivery system when the DC voltage boost converter is bypassed, then provide the unboosted DC voltage at the output of the selective boost converter.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 1 illustrates a block diagram of one embodiment of a voltage boost system configured to enhance direct current power efficiency of a modified direct current power delivery system; and FIG. 2 illustrates a flow diagram of one embodiment of a method of enhancing direct power.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

To enhance the DC output power efficiency, when the efficiency of the combination would be undesirably low, the DC voltage boost converter may be selectively bypassed so that it no longer provides a boosted DC voltage to the power conductors and its DC power consumption is reduced. For some embodiments, techniques are provided for enhancing the DC power efficiency of a modified DC power delivery system by selectively providing a boosted DC voltage. The boosted DC voltage is provided, e.g., at the DC voltage output of a selective boost converter, if providing the boosted DC voltage would cause a DC power efficiency of the modified DC power delivery system to exceed a DC power efficiency of the modified DC power delivery system when the boosted DC voltage is not provided, e.g., at the DC voltage output of the selective boost converter. If providing the boosted DC voltage would cause the DC power efficiency of the modified DC power delivery system to not exceed the DC power efficiency of the modified DC power delivery system when the boosted DC voltage is not provided at the DC voltage output, then an unboosted DC voltage is provided, e.g., at the DC voltage output of the modified DC power delivery system. Unboosted DC voltage (or unboosted voltage) means a DC voltage provided at a DC input of the selective boost converter, e.g., by DC power source(s). Boosted DC voltage (or boosted voltage) means a voltage level that is larger than a level of the unboosted voltage.

The selective boost converter may be configured to provide a boosted DC voltage that is either a dynamically boosted DC voltage, a static boosted DC voltage, or a hybrid boosted DC voltage. The selective boost converter may provide one of at least three boosting types: dynamic, static, or hybrid boosting. Static boosting means providing a boosted voltage that has a fixed voltage level regardless of a direct current level drawn from the selective boost converter (or a modified power delivery system). Hybrid boosting means providing static boosting only when the direct current level drawn from the output of the selective boost converter (or a modified power delivery system) exceeds a selective boosting threshold level. Hybrid boosting prevents delivering a DC voltage to a DC input of a radio that exceeds a maximum DC input voltage of the radio; if the DC voltage at the DC input of the radio exceeds the maximum DC input voltage of the radio, the radio may turn off (causing a lack of continuity of communication services) and/or damage the radio. Dynamic boosting means providing a boosted voltage that can vary based upon at least one electrical parameter which can vary when the boosted voltage is provided.

Optionally, for dynamic boosting, the boosted voltage level may be determined based upon a measured electrical parameter: (a) direct current drawn from an output of the selective boost converter (or the modified power delivery system) and/or (b) a DC voltage at a radio ends of power conductors (or a DC voltage input of the radio). If such direct current is measured, a desired target voltage at the radio ends of power conductors (or a DC voltage input of the radio) is provided, and a resistance of the power conductors is obtained, the boosted voltage is determined based upon a function of the target voltage plus a product of the measured direct current multiplied by a resistance of the power conductors. The resistance of the power conductors may be provided by user input and/or may be otherwise determined. If the DC voltage and the DC current are measured, the desired target voltage at the radio ends of power conductors (or a DC voltage input of the radio) is provided, the resistance of the power conductors can be determined by measuring current at two or more different measured voltage levels for a DC output voltage of the selective boost converter (or the modified power delivery system).

Optionally, when a boost converter of the selective boost converter is not utilized (or is bypassed) it may be disabled (or deactivated) to further reduce DC power consumption of the boost converter, and thus the selective boost converter and the modified power delivery system. As a result, DC power efficiency of the modified power delivery system may be further increased. When disabled, all or part of the boost converter is fully or partially powered off.

Optionally, the power delivery system can utilize (or not bypass) the boost converter (a) when the power delivery system utilizes DC power supplied by at least one battery and/or (b) when direct current drawn through the power conductors by the radio is equal to or exceeds a safety current threshold level less than or equal to a maximum rated DC level of the power conductors. When DC power is provided by at least one battery, utilizing the boost converter reduces direct current drawn from the at least one battery and thus prolongs battery lifetime. The maximum rated DC level of the power conductors may be specified by law, regulation, or specification, e.g., the U.S. National Electrical code. Direct current in excess of the maximum rated DC level may cause power dissipation in the power conductors that results in thermal temperatures which can melt insulation surrounding the power conductors.

FIG. 1 illustrates a block diagram of one embodiment of a voltage boost system configured to enhance direct current power efficiency of a modified direct current (DC) power delivery system (or modified power delivery system) 100. The modified power delivery system 100 includes the selective boost converter 102 and electrical power conductors (power conductors) 120. A DC output port (Vout/Return Out), e.g., at output conductors 102B, of the selective boost converter 102 is configured to be electrically coupled to a converter ends 120a of the power conductors 120. Radio ends 120b of the power conductors 120 are opposite the converter ends 120a. The radio ends 120b are remote from the selective boost converter 102; the converter ends 120a are remote from a radio 116.

The modified power delivery system 100 is configured to provide DC power, through the power conductors 120, to a radio 116. The power conductors 120 electrically couple the selective boost converter 102 to the radio 116. For purposes of clarity, the DC power source(s) 104, the radio 116, the voltage sensor 123, and the optional powered equipment 108 are not part of the modified power delivery system 100.

The modified power delivery system 100 is configured to be coupled to, and to receive DC power from, at least one DC power source (DC power source(s)) 104. The DC power source(s) 104 may also provide power to optional powered equipment 108. For example, the optional powered equipment 108 may include a baseband unit 108A and/or cooling equipment to cool an enclosure comprising the selective boost converter 102 and/or the optional baseband equipment 108A.

An input of the baseband unit 108A is optionally communicatively coupled to an optional second output of the processing circuitry 112. Optionally, the processing circuitry 112 is configured to be able to command the baseband unit 108A to send varying rates of data to the radio 116 so as to be able to control the DC power consumption of the radio 116. Although a baseband unit 108A is illustrated for pedagogical purposes, a distributed unit or a similar component may be used in lieu of a baseband unit. The processing circuitry 112 may be communicatively coupled to a distributed unit (remotely located from the selective boost converter 102 and any enclosure containing the optional powered equipment 108 and/or the selective boost converter 102). Distributed units are used, for example, in an open radio access network (O-RAN).

The DC power source(s) 104 comprises at least one primary power source (or non-battery power supply) and optionally a battery. The at least one primary power source may be ab alternating current (AC) to DC (AC/DC) power supply, but may alternatively be or include other types of non-battery DC power sources such as solar cells. The DC power source(s) 104 are configured to provide an unboosted voltage ($V_{Unboosted}$) to the selective boost converter 102. Optionally, if the DC power source(s) 104 comprises both the AC/DC power supply and the battery, the DC power source(s) 104 is configured to supply DC power from the battery when the AC/DC power supply is not properly functioning. Optionally, the DC voltage provided by the battery is lower than the DC voltage provided by the AC/DC power supply.

Optionally, the DC power source(s) 104 are configured to be coupled to, and thus provide DC power to optional powered equipment 108. The optional powered equipment 108 is electrical equipment, cooling equipment, etc., geographically proximate to the DC power source(s) 104 and/or the selective boost converter 102, and not geographically proximate to the radio 116. Optionally, the DC power source(s), the selective boost converter, and the optional powered equipment 108 may reside in a common enclosure.

In the illustrated embodiment, the selective boost converter 102 comprises input electrical conductors (or input conductors) 102A, output electrical conductors (or output conductors) 102B, a boost converter 114, a processing system (or processing circuitry) 112, a switch (or switch circuitry) 118, and a current sensor 121. The selective boost converter 102 can be implemented in other ways. The selective boost converter 102 is further configured to selectively provide either a boosted voltage ($V_{Boosted}$) or an unboosted voltage ($V_{Unboosted}$) at an output of the selective boost converter 102 and to converter ends 120a of the power conductors 120.

The selective boost converter 102 provides at its output, e.g., the output conductors 102B, the boosted voltage ($V_{Boosted}$) to (e.g., the converter ends 120a of) the power conductors 120 when providing the boosted voltage ($V_{Boosted}$) to the power conductors 120 would increases DC power efficiency of the modified power delivery system 100. The selective boost converter 102 provides the unboosted voltage ($V_{Unboosted}$) to (e.g., the converter ends 120a of) the power conductors 120 when providing the boosted voltage ($V_{Boosted}$) to the power conductors 120 in the alternative would not increase the DC power efficiency of a combination of the modified power delivery system 100.

In the illustrated embodiment, the selective boost converter 102 comprises input conductors 102A, output conductors 102B, a DC voltage boost converter (boost converter) 114, switch circuitry 118, processing circuitry (or processing system) 112, a current sensor 121, and input circuitry 113. The output conductors 102B are configured to be electrically coupled to the power conductors 120.

The input conductors 102A are configured to be electrically coupled to the DC power source(s) 104; the DC power source(s) 104 is configured to provide DC power, e.g., with a DC voltage of −48 to −54V, to an input (e.g., the input conductors 102A) of the selective boost converter 102. The input conductors 102A are electrically coupled to an input port (Vin/Return in) of the selective boost converter 102 and the boost converter 114. The output of the boost converter 114 is electrically coupled to a first input port of the switch circuitry 118. A second input port of the switch circuitry 118 is electrically coupled to the input conductors 102A. An output port of the switch circuitry 118 is electrically coupled to the output conductors 102B. A control node of the switch circuitry 118 is electrically coupled to a first output of the processing circuitry 112 and is configured to receive a first control signal S1 from the processing circuitry 112. Based upon the first control signal S1, the switch circuitry 118 is configured to electrically connect its output node to either its first or second input ports, and thus provide either the boosted voltage ($V_{Boosted}$) or the unboosted voltage ($V_{Unboosted}$) to the output conductors 102B. The switch circuitry 118 may be implemented with a single pole, double throw switch (SPDT). The switch circuitry 118, however, may be implemented in other ways with other types of switch types and/or electrical devices, e.g., transistors (for example field effect transistor(s) (FET(s)), diode(s), and/or other electrical devices. Bypass, as used herein, means that a DC power output of the boost converter is not provided, e.g., through the switch circuitry 118, to the output conductors 102B (e.g., to a DC power output of the selective boost converter 102).

The boost converter 114 may also be referred to as a DC-DC boost converter. Optionally, the boost converter 114 has an enable input and/or a trim input (EN/TRIM). The enable input (EN) is configured to turn the boost converter 114 on and off (or activate or deactivate the boost converter 114). When enabled (or activated), the boost converter 114 is configured to provide a boosted DC voltage ($V_{Boost}$) at an output of the boost converter 114 that is larger than the DC voltage, e.g., provided from the DC power source(s) 104, at the input of the boost converter 114. When powered off, the boost converter 114 does not provide the boosted DC voltage ($V_{Boost}$) at the output of the boost converter 114, and consumes less DC power; thus, when the boosted DC voltage ($V_{Boost}$) is not needed at the output of the boost converter 114 boost converter 114, the boost converter 114 may be disabled (not enabled or powered down) and DC power efficiency of the modified power delivery system 100 is increased. The trim input (TRIM) is configured set or adjust a level of the boost voltage ($V_{Boost}$) provided at an output of the boost converter 114 when the boost converter 114 is operational, e.g., enabled. The boost converter 114 may provide static, dynamic, or hybrid boosting as described elsewhere herein.

The processing circuitry 112 has an optional third output electrically coupled to the optional at least one of the enable input (EN) and the trim input (TRIM) of the boost converter 114. The optional third output is configured to provide an optional second control signal(s) S2 to the at least one of an enable input (EN) and a trim input (TRIM) of the boost converter 114. The optional second control signal (S2) received at the enable input (EN) is configured to enable or disable the boost converter 114. The optional second control signal (S2) received at the trim input (TRIM) is configured to set a voltage level of the boosted voltage $V_{Boosted}$ provided at the output of the boost converter 114. Optionally, the processing circuitry 112 is configured to enable (or activate) the boost converter 114 only when the boosted voltage $V_{Boosted}$ is to be provided to the output conductors 102B (as discussed elsewhere herein); optionally, when the unboosted voltage $V_{Unboosted}$, the processing circuitry 112 is configured to disable (or deactivate) the boost converter 114 so as to further reduce DC power consumption of the boost converter 114 and improve the DC power efficiency of the modified power delivery system 100.

The current sensor 121 is magnetically and/or electrically coupled to the output conductors 102B. The current sensor 121 is configured to measure current drawn through the output conductors 102B. Optionally, the current sensor 121 may be a magnetic current sensor such as a Hall effect sensor or a shunt resistor (in combination with an isolation amplifier or analog to digital converter (ADC)). An output of the current sensor 121 is electrically coupled to the processing circuitry 112, and is configured to provide to the processing circuitry 112 a third signal S3 that indicates the current level measured by the current sensor 121.

Optionally, the processing circuitry 112 comprises a data storage (DS or data storage circuitry) 112a, e.g., stored in memory circuitry. Optionally, processing circuitry 112, e.g., the data storage, stores data about the DC power efficiency of the modified power delivery system 100 (e.g., data for fitting first and second equations, the first and second equations, and/or a corresponding selective boosting threshold described elsewhere herein), a safety current threshold level described elsewhere herein, and/or whether the boost converter 114 (and thus the selective boost converter 102) is configured to operate as dynamic, static, or hybrid boost converter. Optionally, DC power efficiency data for the modified power delivery system includes a DC power efficiency of the boost converter 114 with respect to may be an output power of the boost converter 114. Optionally, the data storage may also store the resistance of the power conductors 120.

The selective boost converter 102 optionally includes input circuitry 113. The input circuitry 113 is electrically coupled to a third input of the processing circuitry 112. The input circuitry 113 may be configured to receive data, through user input, for at least one parameter, e.g., electrical parameter, related a resistance of the power conductors 120 and/or a DC voltage, at the radio ends 120b or at the DC power input of the radio 116, measured by a voltage sensor 123. For purposes of clarity, the voltage sensor is not part of the selective boost converter 102. Data received by the input circuitry 113 is conveyed to the processing circuitry, and may be used to determine the boosted voltage ($V_{Boosted}$) when the boost converter 114 is operated as a dynamic boost converter.

The processing circuitry 112 is described for pedagogical purposes as having more than one input and more than one output. The boost converter 114 is described for pedagogical purposes as having more than one input. The processing circuitry 112 and/or the boost converter 114 may have fewer inputs and outputs, e.g., a single input/output port.

Optionally, the processing circuitry 112 includes a first input electrically coupled to the current sensor 121. The first input of the processing circuitry 112 is configured to receive, from the current sensor 121, a third signal indicating a level of direct current flowing through the output conductors 102B (and thus the output of the selective boost converter 102).

Optionally, the processing circuitry 112 includes an optional second input configured to be electrically coupled to the DC power source(s) 104, across the input conductors 102A; in this embodiment, the processing circuitry 112 comprises a voltage sensor configured to measure a DC voltage across the input conductors 102A. However, in other embodiments, the voltage sensor may be located remotely from the processing circuitry 112. Optionally, in addition or as an alternative to the foregoing embodiment, the second input of the processing circuitry 112 is configured to receive a fourth signal S4 indicating whether or not the DC power source(s) 104 is providing DC power from at least one battery. The fourth signal S4 may be a voltage level and/or any other type of signal indicating whether or not DC power source(s) 104 is providing DC power from at least one battery.

The processing circuitry 112 is configured to control whether the switch circuitry electrically couples, to the output conductors 102B, the boosted voltage $V_{Boosted}$ from the output of the boost converter 114 or the unboosted voltage $V_{Unboosted}$ from the output of the DC power source(s) 104. Optional techniques which may be used by the processing circuitry 112 to do so are described as follows with respect to FIG. 2.

FIG. 2 illustrates a flow diagram of one embodiment of a method 200 of enhancing direct power. Method 200 may be implemented with apparatus, e.g., the selective boost converter 102, described with respect to FIG. 1, but may be implemented with other apparatus as well. To the extent method 200 is described with respect to FIG. 1, it is for pedagogical purposes. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Optionally, in block 230, at least one parameter related to a resistance of the power conductors 120 is obtained, e.g., by the input circuitry 113 and/or the processing circuitry 112. The at least one parameter may be the resistance of the power conductors 120 or parameters (e.g., conductor gauge and conductor length) which can be used to determine the resistance of the power conductors 120; if such parameters which can be used to determine the resistance of the power conductors 120 are obtained, then the resistance of the power conductors 120 is obtained, from such parameters, using conventional techniques, e.g., by the processing circuitry 112. Optionally, a DC voltage measured, e.g., by the voltage sensor 123, at the radio ends 120b of the power conductors 120 or a DC voltage input of the radio 116 is received, e.g., from the voltage sensor and by the input circuitry 113 and/or the processing circuitry 112. Optionally, proceed to block 232, 234, or 240.

Optionally, in block 232, the selective boosting threshold level, for the modified power delivery system 100, is obtained. Optionally, the selective boosting threshold level may be obtained by one of the following techniques: by user input through the input circuitry 113, from the data storage 112a where it was previously stored, or by calculation. Optionally, the selective boosting threshold level may be calculation as follows; however, the selective boosting threshold level may be determined in other ways. The processing circuitry 112 may be further configured, prior to normal operation of the radio 116, to cause the radio to consume from low to maximum DC power levels by causing the baseband unit 108A to send the radio 116 varying data rates. For each discrete DC power consumption level of the radio 116, the selective boost converter is configured to receive a direct current level, e.g., measured with the current sensor 121 drawn by the radio 116 through the power conductors 120, and optionally, a DC voltage level substantially simultaneously measured (when the current level is measured), e.g., by the voltage sensor 123, at the radio ends 120b of the power conductors 120 or at the DC input of the radio 116. Optionally, the measured direct current level and the optional measured DC voltage level may be multiplied to determine a DC power consumed by the radio at substantially the same time such direct current and DC voltage levels are measured.

Firstly, the processing circuitry 112 can undertake such measurements when the selective boost converter 102 is not utilized (bypassed), and thus when a DC voltage at the converter ends 120a of the power conductors 120 is a DC voltage, e.g., –54V to –57V, supplied by the DC power source(s) 104. The measured direct current level can be used to determine a power loss in the power conductors 120 based upon the equation a square of the measured direct current level multiplied by the resistance of the power conductors 120. The power loss in the power conductors 120 is a power loss of the modified power delivery system 100 when the selective boost converter 102 is not utilized. A first equation relates the power loss of the power conductors 120 of the modified power delivery system 100 with the boost converter 114 is bypassed versus a measured direct current level drawn through the power conductors 120, e.g., by the radio, or a determined DC power level desired at radio ends 120b of the power conductors 120, e.g., and consumed by the radio. The first equation can be fit using least squares analysis or other techniques.

Secondly, the processing circuitry 112 can undertake such measurements when the selective boost converter 102 is utilized (not bypassed), and for a specific boosting type (described elsewhere herein). The measured direct current level can be used to determine the power loss in the power conductors 120 based upon the equation a square of the measured direct current level multiplied by the resistance of the power conductors 120. The processing circuitry 112 also sets a voltage (the boosted or unboosted voltage) level at the output of the selective boost converter 102. The processing circuitry 112 stores the voltage at the output for the selective boost converter 102 substantially contemporaneously when the direct current level is measured. An output power of the selective boost converter 102 may be determined by multiplying the voltage level at the output of the selective boost converter 102 times the substantially contemporaneously measured direct current level. A loss of DC power loss of the selective boost converter 102, or boost converter 114, is determined by subtracting a product (of the output power of the selective boost converter 102 by the DC power efficiency for such output power level) from the output power of the selective boost converter 102. Optionally, DC power efficiency of the DC voltage boost converter with respect to DC output power of the DC voltage boost converter may be stored in the processing circuitry 112 such as in the data storage 112*a*. A second equation relates a power loss of the power conductors 120 and the selective boost converter 102 of the modified power delivery system 100 with the boost converter 114 not bypassed versus respectively the measured direct current level drawn through the power conductors 120, e.g., by the radio, or the determined DC power level delivered at the radio ends 120*b* of the power conductors 120, e.g., and consumed by the radio. The second equation can be fit using least squares analysis or other techniques. Both equations must be fitted using the same parameter that is not power loss: the measured direct current level or the determined DC power level consumed by the radio.

Using conventional techniques, such as adding the first and the second equations, the intersection of the first and the second equations can be determined. The intersection is the selective boosting threshold level (which is either a direct current level or DC power level depending upon which parameter was used for fitting both equations. If the direct current drawn through the output conductors, or the DC power delivered to the radio ends 120*b* of the power conductors 120 or at a DC power input of the radio 116, exceeds a corresponding selective boosting threshold level, then a boosted voltage is provided to the output conductors 102B of the selective boost converter 102.

Optionally, the safety current threshold level is obtained, e.g., based upon the received at least one parameter related to power conductor resistance (e.g., conductor gauge) and a look up table stored in the processing circuitry 112, e.g., in the data storage 112*a*, or from user input provided to the input circuitry 113. When a level of the DC current drawn by or the DC power consumed by the radio 116 through the power conductors 120 exceeds a corresponding the selective boosting threshold level, the DC power efficiency of the modified power delivery system 100 is higher with the boost converter utilized (not bypassed) than with the boost converter not utilized (bypassed). When the level of the DC current drawn by or the DC power consumed by the radio 116 through the power conductors 120 does not exceeds a corresponding the selective boosting threshold level, the DC power efficiency of the modified power delivery system 100 is higher with the boost converter utilized (not bypassed) than with the boost converter not utilized (bypassed).

Optionally, in block 234, the source of DC power, e.g., of the DC power source(s) 104 providing DC power to a DC power input of the selective boost converter 102, is determined. Optionally, determining the source of DC power means determining whether the source of DC power, e.g., to the selective boost converter 102, is a battery or not a battery. Optionally, the source of DC power may be determined by a measured voltage level indicating a type of DC power source (for example, a lower voltage, e.g., −48 VDC, for a battery versus a higher voltage level, e.g., −54 to −57 VDC for an AC/DC power supply, or by a signal indicating a type of DC power source. For example, it is determined whether the DC power source is the battery or another type of non-battery DC power source such as an AC/DC power supply, solar cells, etc.

Optionally, in block 236, whether the DC power source is a battery is determined. If the DC power source is determined to be a battery, then in block 238, a boosted voltage is generated and provided, e.g., respectively by the boost converter 114 and at the DC power output of the selective boost converter 102. Optionally, prior to generating and providing the boosted voltage, enable the boost converter 114. Optionally, after performing block 238, proceed to block 236. If the DC power source is determined not to be a battery in block 236, then proceed to block 240.

In block 240, a direct current level drawn by the radio 116 through the power conductors 120 is received or measured, e.g., from or with the current sensor 121. Thus, the measured direct current is a direct current level output by the modified power delivery system 100. Optionally, a voltage at the radio ends 120*b* or at the DC power input of the radio 116 is measured, e.g., with the voltage sensor 123.

In block 242, determine if a DC power efficiency (n) of the modified power delivery system 100 with the voltage booster utilized (not bypassed) for a measured DC current level (e.g., drawn by the radio 116 through the power conductors 120 from the selective boost converter 102) or the DC power consumed by the radio 116 would be larger than a DC power efficiency (n) of the modified power delivery system 100 with the voltage booster not utilized (bypassed) for respectively the measured DC current level DC or the DC power consumed by the radio 116. Optionally, block 242 may be implemented in a manner illustrated elsewhere herein or with other techniques. If the DC power efficiency of the modified power delivery system 100 with the voltage booster not bypassed would be larger than the DC power efficiency of the modified power delivery system 100 with the voltage booster bypassed, then proceed to block 238. If the DC power efficiency of the modified power delivery system 100 with the voltage booster not bypassed would not be larger than the DC power efficiency of the modified power delivery system 100 with the voltage booster bypassed, then proceed to blocks 244 or 246.

In optional block 244, whether the measured direct current level is equal to or greater than the safety current threshold level is determined. If the measured direct current level is equal to or greater than the safety current threshold level, then proceed to block 238. If the measured direct current level is not equal to and not greater than the safety current threshold, then proceed to block 246. In block 246, an unboosted DC voltage, e.g., provided at an input of the selective boost converter 102 and thus an input of the boost converter 114, is provided, e.g., at the output for the selective boost converter 102. Optionally, disable the boost converter 114. Optionally after block 246, proceed to block 238.

The processing circuitry 112 may include any one or combination of microcontroller(s), microprocessor(s), digital signal processor(s), application specific integrated circuit(s), field programmable gate array(s), and/or other types of processing circuitry. The processing circuitry 112 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures, and can include any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media. The memory may also include one or more databases to store acquired data.

The memory functions (e.g. memory circuitry) described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to control logic circuitry, and executed by the control logic circuitry. Generally, program modules or applications include routines, programs, objects, data components, data structures, algorithms, and the like, which perform particular tasks or implement particular abstract data types.

The terms "about" or "substantially" mean that the value or parameter specified may be somewhat altered, as long as the alteration does not result in nonconformance of the process or structure to the illustrated embodiment from the perspective of one having ordinary skill in the art. For instance, unless otherwise indicated, a numerical quantity modified by the term "substantially" can be altered to within ±20% of the specified value. Finally, the term "exemplary" merely indicates the accompanying description is used as an example, rather than implying an ideal, essential, or preferable feature of the invention.

Example Embodiments

Example 1 includes a selective boost converter configured to provide direct current (DC) power through power conductors to a radio, the selective boost converter comprising: input electrical conductors configured to be electrically coupled to at least one DC power source providing an unboosted DC voltage; output electrical conductors configured to be electrically coupled to the radio through the power conductors; switch circuitry electrically coupled to the output electrical conductors and the input electrical conductors; a DC voltage boost converter comprising a DC power input and a DC power output, wherein the DC power input of the DC voltage boost converter is electrically coupled to the input electrical conductors, wherein the DC power output of the DC voltage boost converter is electrically coupled to the switch circuitry; a current sensor coupled to the output electrical conductors and configured to measure a direct current level drawn through the output electrical conductors and output by a DC power delivery system; input circuitry configured to obtain at least one electrical parameter related to a resistance of the power conductors; and processing circuitry electrically coupled to the input circuitry and the switch circuitry, and configured to: based upon the measured direct current level, determine if a DC power efficiency of the DC power delivery system when the DC voltage boost converter is not bypassed is larger than a DC power efficiency of the DC power delivery system when the DC voltage boost converter is bypassed, wherein the DC power delivery system comprises the selective boost converter and the power conductors, and wherein the DC power efficiency of the DC power delivery system means a DC power output level by the DC power delivery system divided by a DC power level received by the DC power delivery system; upon determining that the DC power efficiency of the DC power delivery system when the DC voltage boost converter is not bypassed is larger than the DC power efficiency of the DC power delivery system when the DC voltage boost converter is bypassed, then provide a boosted DC voltage, generated by the DC voltage boost converter and from the unboosted DC voltage, through the switch circuitry to the output electrical conductors, wherein the boosted DC voltage greater than the unboosted DC voltage; and upon determining that the DC power efficiency of the DC power delivery system when the DC voltage boost converter is not bypassed is not larger than the DC power efficiency of the DC power delivery system when the DC voltage boost converter is bypassed, then provide the unboosted DC voltage through the switch circuitry to the output electrical conductors.

Example 2 includes the selective boost converter of Example 1, wherein the processing circuitry is configured to receive at least one parameter related to a resistance of the power conductors.

Example 3 includes the selective boost converter of any of Examples 1-2, wherein the processing circuitry is further configured to: determine whether the at least one DC power source is a battery; and upon determining that the at least one DC power source is the battery, then cause the boosted DC voltage, generated by the DC voltage boost converter and from the unboosted DC voltage, to be provided through the switch circuitry to the output electrical conductors.

Example 4 includes the selective boost converter of any of Examples 1-3, wherein the processing circuitry is further configured to: determine whether the measured direct current level output by the DC power delivery system is equal to or is larger than a safety current threshold level that is less than or equal to a maximum rated DC level of the power conductors; and upon determining that the measured direct current level output by the DC power delivery system is equal to or is larger than the safety current threshold level that is less than or equal to the maximum rated DC level of the power conductors, then cause the boosted DC voltage, generated by the DC voltage boost converter and from the unboosted DC voltage, to be provided through the switch circuitry to the output electrical conductors.

Example 5 includes the selective boost converter of any of Examples 1-4, wherein the processing circuitry is further configured to: receive a DC voltage level measured at radio ends of the power conductors or at the DC power input of the radio; and determine a DC power level provided by the DC power delivery system at the radio ends using the DC voltage level and the measured direct current level.

Example 6 includes the selective boost converter of any of Examples 1-5, wherein the processing circuitry is further configured to: obtain a selective boosting threshold level for the DC power delivery system; wherein determining if the DC power efficiency of the DC power delivery system when the DC voltage boost converter is not bypassed is larger than the DC power efficiency of the DC power delivery system when the DC voltage boost converter is bypassed comprises determining if the measured direct current level or a power level based upon the measured direct current level exceeds the selective boosting threshold level; and wherein determining that the DC power efficiency of the DC power delivery system when the DC voltage boost converter is not bypassed is larger than the DC power efficiency of the DC power delivery system when the DC voltage boost converter is bypassed comprises determining that the measured direct current level or the power level based upon the measured direct current level exceeds the selective boosting threshold level; wherein determining that the DC power efficiency of the DC power delivery system when the DC voltage boost converter is not bypassed is not larger than the DC power efficiency of the DC power delivery system when the DC voltage boost converter is bypassed comprises determining that the measured direct current level or the power level based upon the measured direct current level does not exceed the selective boosting threshold level.

Example 7 includes the selective boost converter of Example 6, wherein obtaining the selective boosting threshold level for the DC power delivery system comprises: determining an intersection of a first equation and a second equation; and wherein the first equation relates a power loss of the power conductors of the DC power delivery system with the DC voltage boost converter bypassed versus either a measured direct current level drawn through the power conductors or a DC power level delivered at radio ends of the power conductors; wherein the second equation relates a power loss of the power conductors and the selective boost converter of the DC power delivery system with the DC voltage boost converter not bypassed versus either respectively the measured direct current level drawn through the power conductors or the DC power level delivered at the radio ends of the power conductors.

Example 8 includes the selective boost converter of any of Examples 1-7, wherein the processing circuitry is further configured to, when the DC voltage boost converter is bypassed, to disable the DC voltage boost converter and further reduce DC power consumption of the DC voltage boost converter.

Example 9 includes the selective boost converter of any of Examples 1-8, wherein the processing circuitry is configured to store data about DC power efficiency of the DC voltage boost converter with respect to DC output power of the DC voltage boost converter.

Example 10 includes a method for enhancing direct current (DC) power efficiency of a DC power delivery system configured to provide DC power, through power conductors, to a DC power input of a radio, the method comprising: receiving or measuring a direct current level drawn through the power conductors and output by the DC power delivery system, wherein the DC power delivery system comprises a selective boost converter and the power conductors, wherein the selective boost converter comprises a DC voltage boost converter, and wherein the DC voltage boost converter can be selectively bypassed or not bypassed; based upon the received or the measured direct current level, determining if a DC power efficiency of the DC power delivery system when the DC voltage boost converter is not bypassed is larger than a DC power efficiency of the DC power delivery system when the DC voltage boost converter is bypassed, wherein the DC power efficiency of the DC power delivery system means a DC power output level by the DC power delivery system divided by a DC power level received by the DC power delivery system; determining that the DC power efficiency of the DC power delivery system when the DC voltage boost converter is not bypassed is larger than the DC power efficiency of the DC power delivery system when the DC voltage boost converter is bypassed, then generating, with the DC voltage boost converter and from an unboosted DC voltage, a boosted DC voltage and providing the boosted DC voltage at an output of the selective boost converter, wherein the boosted DC voltage greater than the unboosted DC voltage; and determining that the DC power efficiency of the DC power delivery system when the DC voltage boost converter is not bypassed is not larger than the DC power efficiency of the DC power delivery system when the DC voltage boost converter is bypassed, then providing the unboosted DC voltage at the output of the selective boost converter.

Example 11 includes the method of Example 10, further comprising obtaining at least one parameter related to a resistance of the power conductors.

Example 12 includes the method of any of Examples 10-11, further comprising: determining whether at least one DC power source, which provides DC power to a DC power input the selective boost converter, is a battery; and determining that the at least one DC power source is the battery, then generating a boosted voltage, with the DC voltage boost converter and from the unboosted DC voltage, and providing the boosted DC voltage at the output of the selective boost converter.

Example 13 includes the method of any of Examples 10-12, further comprising: determining whether the received or measured direct current level output by the DC power delivery system is equal to or is larger than a safety current threshold level that is less than or equal to a maximum rated DC level of the power conductors; and determining that the received or measured direct current level output by the DC power delivery system is equal to or is larger than the safety current threshold level that is less than or equal to the maximum rated DC level of the power conductors, then generating a boosted voltage, with the DC voltage boost converter and from the unboosted DC voltage, and providing the boosted DC voltage at the output of the selective boost converter.

Example 14 includes the method of any of Examples 10-13, further comprising: receiving a DC voltage level measured at radio ends of the power conductors or at the DC power input of the radio; and determining a DC power level provided by the DC power delivery system at the radio ends using the DC voltage level and the received or the measured direct current level.

Example 15 includes the method of any of Examples 10-14, further comprising: obtaining a selective boosting threshold level for the DC power delivery system; wherein determining if the DC power efficiency of the DC power delivery system when the DC voltage boost converter is not bypassed is larger than the DC power efficiency of the DC power delivery system when the DC voltage boost converter is bypassed comprises determining if the received or the measured direct current level or a power level based upon the received or the measured direct current level exceeds the selective boosting threshold level; and wherein determining that the DC power efficiency of the DC power delivery system when the DC voltage boost converter is not bypassed is larger than the DC power efficiency of the DC power delivery system when the DC voltage boost converter is bypassed comprises determining that the received or the measured direct current level or the power level based upon the received or the measured direct current level exceeds the selective boosting threshold level; wherein determining that the DC power efficiency of the DC power delivery system when the DC voltage boost converter is not bypassed is not larger than the DC power efficiency of the DC power delivery system when the DC voltage boost converter is bypassed comprises determining that the received or the measured direct current level or the power level based upon the received or the measured direct current level does not exceed the selective boosting threshold level.

Example 16 includes the method of Example 15, wherein obtaining the selective boosting threshold level comprises: determining an intersection of a first equation and a second equation; and wherein the first equation relates a power loss of the power conductors of the DC power delivery system with the DC voltage boost converter bypassed versus either a direct current level drawn through the power conductors or a DC power level delivered at radio ends of the power conductors; wherein the second equation relates a power loss of the power conductors and the selective boost converter of the DC power delivery system with the DC voltage boost converter not bypassed versus either respectively the direct current level drawn through the power conductors or the DC power level delivered at the radio ends of the power conductors.

Example 17 includes the method of any of Examples 10-16, wherein providing the unboosted DC voltage further comprises disabling the DC voltage boost converter and further reducing DC power consumption of the DC voltage boost converter.

Example 18 includes a program product for enhancing direct current (DC) power efficiency of a DC power delivery system configured to provide DC power, through power conductors, to a DC power input of a radio, and comprising a non-transitory processor readable medium on which program instructions are embodied, wherein the program instructions are configured, when executed by at least one processor, to cause the at least one processor to: receive or measure a direct current level drawn through the power conductors and output by the DC power delivery system, wherein the DC power delivery system comprises a selective boost converter and the power conductors, wherein the selective boost converter comprises a DC voltage boost converter, and wherein the DC voltage boost converter can be selectively bypassed or not bypassed; based upon the received or the measured direct current level, determine if a DC power efficiency of the DC power delivery system when the DC voltage boost converter is not bypassed is larger than a DC power efficiency of the DC power delivery system when the DC voltage boost converter is bypassed, wherein the DC power efficiency of the DC power delivery system means a DC power output level by the DC power delivery system divided by a DC power level received by the DC power delivery system; upon determining that the DC power efficiency of the DC power delivery system when the DC voltage boost converter is not bypassed is larger than the DC power efficiency of the DC power delivery system when the DC voltage boost converter is bypassed, then generate, with the DC voltage boost converter and from an unboosted DC voltage, a boosted DC voltage and providing the boosted DC voltage at an output of the selective boost converter, wherein the boosted DC voltage greater than the unboosted DC voltage; and upon determining that the DC power efficiency of the DC power delivery system when the DC voltage boost converter is not bypassed is not larger than the DC power efficiency of the DC power delivery system when the DC voltage boost converter is bypassed, then provide the unboosted DC voltage at the output of the selective boost converter.

Example 19 includes the program product of Example 18, wherein the program instructions are configured, when executed by the at least one processor, to further cause the at least one processor to obtain at least one parameter related to a resistance of the power conductors.

Example 20 includes the program product of any of Examples 18-19, wherein the program instructions are configured, when executed by the at least one processor, to further cause the at least one processor to: determine whether at least one DC power source, which provides DC power to a DC power input the selective boost converter, is a battery; and determining that the at least one DC power source is the battery, then generate a boosted voltage, with the DC voltage boost converter and from the unboosted DC voltage, and providing the boosted DC voltage at the output of the selective boost converter.

Example 21 includes the program product of any of Examples 18-20, wherein the program instructions are configured, when executed by the at least one processor, to further cause the at least one processor to: determining whether a direct current level output by the DC power delivery system is equal to or is larger than a safety current threshold level that is less than or equal to a maximum rated DC level of the power conductors; and determining that the direct current level output by the DC power delivery system is equal to or is larger than the safety current threshold level that is less than or equal to the maximum rated DC level of the power conductors, then generating a boosted voltage, with the DC voltage boost converter and from the unboosted DC voltage, and providing the boosted DC voltage at the output of the selective boost converter.

Example 22 includes the program product of any of Examples 18-21, determining whether the direct current output by the DC power delivery system is equal to or is larger than a safety current threshold level that is less than or equal to a maximum rated DC level of the power conductors; and determining that the direct current output by the DC power delivery system is equal to or is larger than the safety current threshold level that is less than or equal to the maximum rated DC level of the power conductors, then generating a boosted voltage, with the DC voltage boost converter and from the unboosted DC voltage, and providing the boosted DC voltage at the output of the selective boost converter.

Example 23 includes the program product of any of Examples 18-22, wherein the program instructions are configured, when executed by the at least one processor, to further cause the at least one processor to: obtain a selective boosting threshold level for the DC power delivery system; wherein determine if a DC power efficiency of the DC power delivery system when the DC voltage boost converter is not bypassed is larger than a DC power efficiency of the DC power delivery system when the DC voltage boost converter is bypassed comprises determine if the received or the measured direct current level or a power level based upon the received or the measured direct current level exceeds the selective boosting threshold level; and wherein determining that the DC power efficiency of the DC power delivery system when the DC voltage boost converter is not bypassed is larger than the DC power efficiency of the DC power delivery system when the DC voltage boost converter is bypassed comprises determining that the received or the measured direct current level or the power level based upon the received or the measured direct current level exceeds the selective boosting threshold level; wherein determining that the DC power efficiency of the DC power delivery system when the DC voltage boost converter is not bypassed is not larger than the DC power efficiency of the DC power delivery system when the DC voltage boost converter is bypassed comprises determining that the received or the measured direct current level or the power level based upon the received or the measured direct current level does not exceed the selective boosting threshold level.

Example 24 includes the program product of Example 23, wherein obtaining the selective boosting threshold level for the DC power delivery system comprises determining an intersection of a first equation and a second equation; and wherein the first equation relates a power loss of the power conductors of the DC power delivery system with the DC voltage boost converter bypassed versus either a direct current level drawn through the power conductors or a DC power level delivered at radio ends of the power conductors; wherein the second equation relates a power loss of the power conductors and the selective boost converter of the DC power delivery system with the DC voltage boost converter not bypassed versus either respectively the direct current level drawn through the power conductors or the DC power level delivered at the radio ends of the power conductors.

Example 25 includes the program product of any of Examples 18-24, wherein providing the unboosted DC voltage further comprises disabling the DC voltage boost converter and further reducing DC power consumption of the DC voltage boost converter.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A selective boost converter configured to provide direct current (DC) power through power conductors to a radio, the selective boost converter comprising:

input electrical conductors configured to be electrically coupled to at least one DC power source providing an unboosted DC voltage;

output electrical conductors configured to be electrically coupled to the radio through the power conductors;

switch circuitry electrically coupled to the output electrical conductors and the input electrical conductors;

a DC voltage boost converter comprising a DC power input and a DC power output, wherein the DC power input of the DC voltage boost converter is electrically coupled to the input electrical conductors, wherein the DC power output of the DC voltage boost converter is electrically coupled to the switch circuitry;

a current sensor coupled to the output electrical conductors and configured to measure a direct current level drawn through the output electrical conductors and output by a DC power delivery system;

input circuitry configured to obtain at least one electrical parameter related to a resistance of the power conductors; and processing circuitry electrically coupled to the input circuitry and the switch circuitry, and configured to:

based upon the measured direct current level, determine if a DC power efficiency of the DC power delivery system when the DC voltage boost converter is not bypassed is larger than a DC power efficiency of the DC power delivery system when the DC voltage boost converter is bypassed, wherein the DC power delivery system comprises the selective boost converter and the power conductors, and wherein the DC power efficiency of the DC power delivery system means a DC power output level by the DC power delivery system divided by a DC power level received by the DC power delivery system;

upon determining that the DC power efficiency of the DC power delivery system when the DC voltage boost converter is not bypassed is larger than the DC power efficiency of the DC power delivery system when the DC voltage boost converter is bypassed, then provide a boosted DC voltage, generated by the DC voltage boost converter and from the unboosted DC voltage, through the switch circuitry to the output electrical conductors, wherein the boosted DC voltage greater than the unboosted DC voltage; and upon determining that the DC power efficiency of the DC power delivery system when the DC voltage boost converter is not bypassed is not larger than the DC power efficiency of the DC power delivery system when the DC voltage boost converter is bypassed, then provide the unboosted DC voltage through the switch circuitry to the output electrical conductors.

2. The selective boost converter of claim 1, wherein the processing circuitry is configured to receive at least one parameter related to the resistance of the power conductors.

3. The selective boost converter of claim 1, wherein the processing circuitry is further configured to:

determine whether the at least one DC power source is a battery; and upon determining that the at least one DC power source is the battery, then cause the boosted DC voltage, generated by the DC voltage boost converter and from the unboosted DC voltage, to be provided through the switch circuitry to the output electrical conductors.

4. The selective boost converter of claim 1, wherein the processing circuitry is further configured to:

determine whether the measured direct current level output by the DC power delivery system is equal to or is larger than a safety current threshold level that is less than or equal to a maximum rated DC level of the power conductors; and upon determining that the measured direct current level output by the DC power delivery system is equal to or is larger than the safety current threshold level that is less than or equal to the maximum rated DC level of the power conductors, then cause the boosted DC voltage, generated by the DC voltage boost converter and from the unboosted DC voltage, to be provided through the switch circuitry to the output electrical conductors.

5. The selective boost converter of claim 1, wherein the processing circuitry is further configured to:

receive a DC voltage level measured at radio ends of the power conductors or at the DC power input of the radio; and determine a DC power level provided by the DC power delivery system at the radio ends using the DC voltage level and the measured direct current level.

6. The selective boost converter of claim 1, wherein the processing circuitry is further configured to:

obtain a selective boosting threshold level for the DC power delivery system;

wherein determining if the DC power efficiency of the DC power delivery system when the DC voltage boost converter is not bypassed is larger than the DC power efficiency of the DC power delivery system when the DC voltage boost converter is bypassed comprises determining if the measured direct current level or a power level based upon the measured direct current level exceeds the selective boosting threshold level; and wherein determining that the DC power efficiency of the DC power delivery system when the DC voltage boost converter is not bypassed is larger than the DC power efficiency of the DC power delivery system when the DC voltage boost converter is bypassed comprises determining that the measured direct current level or the power level based upon the measured direct current level exceeds the selective boosting threshold level;

wherein determining that the DC power efficiency of the DC power delivery system when the DC voltage boost converter is not bypassed is not larger than the DC power efficiency of the DC power delivery system when the DC voltage boost converter is bypassed comprises determining that the measured direct current level or the power level based upon the measured direct current level does not exceed the selective boosting threshold level.

7. The selective boost converter of claim 6, wherein obtaining the selective boosting threshold level for the DC power delivery system comprises:

determining an intersection of a first equation and a second equation; and wherein the first equation relates a power loss of the power conductors of the DC power delivery system with the DC voltage boost converter bypassed versus either a measured direct current level drawn through the power conductors or a DC power level delivered at radio ends of the power conductors;

wherein the second equation relates a power loss of the power conductors and the selective boost converter of the DC power delivery system with the DC voltage boost converter not bypassed versus either respectively the measured direct current level drawn through the power conductors or the DC power level delivered at the radio ends of the power conductors.

8. The selective boost converter of claim 1, wherein the processing circuitry is further configured to, when the DC voltage boost converter is bypassed, to disable the DC voltage boost converter and further reduce DC power consumption of the DC voltage boost converter.

9. The selective boost converter of claim 1, wherein the processing circuitry is configured to store data about DC power efficiency of the DC voltage boost converter with respect to DC output power of the DC voltage boost converter.

10. A method for enhancing direct current (DC) power efficiency of a DC power delivery system configured to provide DC power, through power conductors, to a DC power input of a radio, the method comprising:

receiving or measuring a direct current level drawn through the power conductors and output by the DC power delivery system, wherein the DC power delivery system comprises a selective boost converter and the power conductors, wherein the selective boost converter comprises a DC voltage boost converter, and wherein the DC voltage boost converter can be selectively bypassed or not bypassed;

based upon the received or the measured direct current level, determining if a DC power efficiency of the DC power delivery system when the DC voltage boost converter is not bypassed is larger than a DC power efficiency of the DC power delivery system when the DC voltage boost converter is bypassed, wherein the DC power efficiency of the DC power delivery system means a DC power output level by the DC power delivery system divided by a DC power level received by the DC power delivery system;

determining that the DC power efficiency of the DC power delivery system when the DC voltage boost converter is not bypassed is larger than the DC power efficiency of the DC power delivery system when the DC voltage boost converter is bypassed, then generating, with the DC voltage boost converter and from an unboosted DC voltage, a boosted DC voltage and providing the boosted DC voltage at an output of the selective boost converter, wherein the boosted DC voltage greater than the unboosted DC voltage; and determining that the DC power efficiency of the DC power delivery system when the DC voltage boost converter is not bypassed is not larger than the DC power efficiency of the DC power delivery system when the DC voltage boost converter is bypassed, then providing the unboosted DC voltage at the output of the selective boost converter.

11. The method of claim 10, further comprising obtaining at least one parameter related to a resistance of the power conductors.

12. The method of claim 10, further comprising:

determining whether at least one DC power source, which provides DC power to a DC power input the selective boost converter, is a battery; and determining that the at least one DC power source is the battery, then generating a boosted voltage, with the DC voltage boost converter and from the unboosted DC voltage, and providing the boosted DC voltage at the output of the selective boost converter.

13. The method of claim 10, further comprising:

determining whether the received or measured direct current level output by the DC power delivery system is equal to or is larger than a safety current threshold level that is less than or equal to a maximum rated DC level of the power conductors; and determining that the received or measured direct current level output by the DC power delivery system is equal to or is larger than the safety current threshold level that is less than or equal to the maximum rated DC level of the power conductors, then generating a boosted voltage, with the DC voltage boost converter and from the unboosted DC voltage, and providing the boosted DC voltage at the output of the selective boost converter.

14. The method of claim 10, further comprising:

receiving a DC voltage level measured at radio ends of the power conductors or at the DC power input of the radio; and determining a DC power level provided by the DC power delivery system at the radio ends using the DC voltage level and the received or the measured direct current level.

15. The method of claim 10, further comprising:

obtaining a selective boosting threshold level for the DC power delivery system;

wherein determining if the DC power efficiency of the DC power delivery system when the DC voltage boost converter is not bypassed is larger than the DC power efficiency of the DC power delivery system when the DC voltage boost converter is bypassed comprises determining if the received or the measured direct current level or a power level based upon the received or the measured direct current level exceeds the selective boosting threshold level; and wherein determining that the DC power efficiency of the DC power delivery system when the DC voltage boost converter is not bypassed is larger than the DC power efficiency of the DC power delivery system when the DC voltage boost converter is bypassed comprises determining that the received or the measured direct current level or the power level based upon the received or the measured direct current level exceeds the selective boosting threshold level;

wherein determining that the DC power efficiency of the DC power delivery system when the DC voltage boost converter is not bypassed is not larger than the DC power efficiency of the DC power delivery system when the DC voltage boost converter is bypassed comprises determining that the received or the measured direct current level or the power level based upon the received or the measured direct current level does not exceed the selective boosting threshold level.

16. The method of claim 15, wherein obtaining the selective boosting threshold level comprises:

determining an intersection of a first equation and a second equation; and wherein the first equation relates a power loss of the power conductors of the DC power delivery system with the DC voltage boost converter bypassed versus either the direct current level drawn through the power conductors or a DC power level delivered at radio ends of the power conductors;

wherein the second equation relates a power loss of the power conductors and the selective boost converter of the DC power delivery system with the DC voltage boost converter not bypassed versus either respectively the direct current level drawn through the power conductors or the DC power level delivered at the radio ends of the power conductors.

17. The method of claim 10, wherein providing the unboosted DC voltage further comprises disabling the DC voltage boost converter and further reducing DC power consumption of the DC voltage boost converter.

18. A program product for enhancing direct current (DC) power efficiency of a DC power delivery system configured to provide DC power, through power conductors, to a DC power input of a radio, and comprising a non-transitory processor readable medium on which program instructions are embodied, wherein the program instructions are configured, when executed by at least one processor, to cause the at least one processor to:

receive or measure a direct current level drawn through the power conductors and output by the DC power delivery system, wherein the DC power delivery system comprises a selective boost converter and the power conductors, wherein the selective boost converter comprises a DC voltage boost converter, and wherein the DC voltage boost converter can be selectively bypassed or not bypassed;

based upon the received or the measured direct current level, determine if a DC power efficiency of the DC power delivery system when the DC voltage boost converter is not bypassed is larger than a DC power efficiency of the DC power delivery system when the DC voltage boost converter is bypassed, wherein the DC power efficiency of the DC power delivery system means a DC power output level by the DC power delivery system divided by a DC power level received by the DC power delivery system;

upon determining that the DC power efficiency of the DC power delivery system when the DC voltage boost converter is not bypassed is larger than the DC power efficiency of the DC power delivery system when the DC voltage boost converter is bypassed, then generate, with the DC voltage boost converter and from an unboosted DC voltage, a boosted DC voltage and providing the boosted DC voltage at an output of the selective boost converter, wherein the boosted DC voltage greater than the unboosted DC voltage; and upon determining that the DC power efficiency of the DC power delivery system when the DC voltage boost converter is not bypassed is not larger than the DC power efficiency of the DC power delivery system when the DC voltage boost converter is bypassed, then provide the unboosted DC voltage at the output of the selective boost converter.

19. The program product of claim 18, wherein the program instructions are configured, when executed by the at least one processor, to further cause the at least one processor to obtain at least one parameter related to a resistance of the power conductors.

20. The program product of claim 18, wherein the program instructions are configured, when executed by the at least one processor, to further cause the at least one processor to:

determine whether at least one DC power source, which provides DC power to a DC power input the selective boost converter, is a battery; and determining that the at least one DC power source is the battery, then generate a boosted voltage, with the DC voltage boost converter and from the unboosted DC voltage, and providing the boosted DC voltage at the output of the selective boost converter.

21. The program product of claim 18, wherein the program instructions are configured, when executed by the at least one processor, to further cause the at least one processor to:

determining whether a direct current level output by the DC power delivery system is equal to or is larger than a safety current threshold level that is less than or equal to a maximum rated DC level of the power conductors; and determining that the direct current level output by the DC power delivery system is equal to or is larger than the safety current threshold level that is less than or equal to the maximum rated DC level of the power conductors, then generating a boosted voltage, with the DC voltage boost converter and from the unboosted DC voltage, and providing the boosted DC voltage at the output of the selective boost converter.

22. The program product of claim 18, wherein the program instructions are configured, when executed by the at least one processor, to further cause the at least one processor to:

obtain a selective boosting threshold level for the DC power delivery system;

wherein determine if a DC power efficiency of the DC power delivery system when the DC voltage boost converter is not bypassed is larger than a DC power efficiency of the DC power delivery system when the DC voltage boost converter is bypassed comprises determine if the received or the measured direct current level or a power level based upon the received or the measured direct current level exceeds the selective boosting threshold level; and wherein determining that the DC power efficiency of the DC power delivery system when the DC voltage boost converter is not bypassed is larger than the DC power efficiency of the DC power delivery system when the DC voltage boost converter is bypassed comprises determining that the received or the measured direct current level or the power level based upon the received or the measured direct current level exceeds the selective boosting threshold level;

wherein determining that the DC power efficiency of the DC power delivery system when the DC voltage boost converter is not bypassed is not larger than the DC power efficiency of the DC power delivery system when the DC voltage boost converter is bypassed comprises determining that the received or the measured direct current level or the power level based upon the received or the measured direct current level does not exceed the selective boosting threshold level.

23. The program product of claim 22, wherein obtaining the selective boosting threshold level for the DC power delivery system comprises determining an intersection of a first equation and a second equation; and wherein the first equation relates a power loss of the power conductors of the DC power delivery system with the DC voltage boost converter bypassed versus either a direct current level drawn through the power conductors or a DC power level delivered at radio ends of the power conductors;

wherein the second equation relates a power loss of the power conductors and the selective boost converter of the DC power delivery system with the DC voltage boost converter not bypassed versus either respectively the direct current level drawn through the power conductors or the DC power level delivered at the radio ends of the power conductors.

24. The program product of claim 18, wherein providing the unboosted DC voltage further comprises disabling the DC voltage boost converter and further reducing DC power consumption of the DC voltage boost converter.

* * * * *